United States Patent
Rand

(10) Patent No.: US 8,341,869 B2
(45) Date of Patent: Jan. 1, 2013

(54) APPARATUS FOR CONTROLLING THE RELEASE OF A TIP-UP SIGNAL INDICATOR FOR A TRAP

(76) Inventor: Ricky Rand, Harrison, ME (US)

( * ) Notice: Subject to any disclaimer, the term of this patent is extended or adjusted under 35 U.S.C. 154(b) by 70 days.

(21) Appl. No.: 13/112,683

(22) Filed: May 20, 2011

(65) Prior Publication Data

US 2011/0271579 A1    Nov. 10, 2011

Related U.S. Application Data

(63) Continuation of application No. 11/966,987, filed on Dec. 28, 2007, now abandoned.

(51) Int. Cl.
*A01K 97/01* (2006.01)
*A01K 97/12* (2006.01)

(52) U.S. Cl. .......................................... 43/17
(58) Field of Classification Search ............... 43/16, 17
See application file for complete search history.

(56) References Cited

U.S. PATENT DOCUMENTS

| | | | | |
|---|---|---|---|---|
| 2,502,231 A * | 3/1950 | Oberg | ............................... | 43/17 |
| 2,785,493 A * | 3/1957 | Thiel | ............................... | 43/17 |
| 2,977,704 A * | 4/1961 | Tinsley | ............................... | 43/17 |
| 3,078,610 A * | 2/1963 | Howell | ............................... | 43/17 |
| 3,807,078 A * | 4/1974 | Bartys | ............................... | 43/17 |
| 4,567,686 A * | 2/1986 | Akom | ............................... | 43/17 |
| 6,688,033 B2 * | 2/2004 | Shaff et al. | ............................... | 43/17 |
| 7,281,348 B2 * | 10/2007 | Allen et al. | ............................... | 43/17 |

* cited by examiner

*Primary Examiner* — Kimberly Berona
(74) *Attorney, Agent, or Firm* — Verrill Dana, LLP; Chris A. Caseiro

(57) ABSTRACT

An ice fishing trap comprising in its operational state a crossbeam dimensioned for extending across a hole in ice covering a body of water, and a hingedly coupled vertical mast. The vertical mast has a rotatable reel dimensioned to carry a length of fishing line and a hook. A trigger mechanism is provided, wherein a rotation of the reel causes an arcuate movement of a trigger hook. One aspect of the invention provides at least two stabilizer limbs hingedly coupled to the crossbeam, so as to form a general Z shaped support base when operational. In another aspect the fishing trap provides a trigger bolt coupled to an indicator spring, wherein the trigger bolt is utilized to couple the indicator spring to the trigger hook. The trigger bolt is slidingly supported by bolt guide, thus providing improved resistance to false indications due wind vibration and the like. Preferably, the trigger bolt is coupled to the indicator spring by a ring shaped coupler.

9 Claims, 11 Drawing Sheets

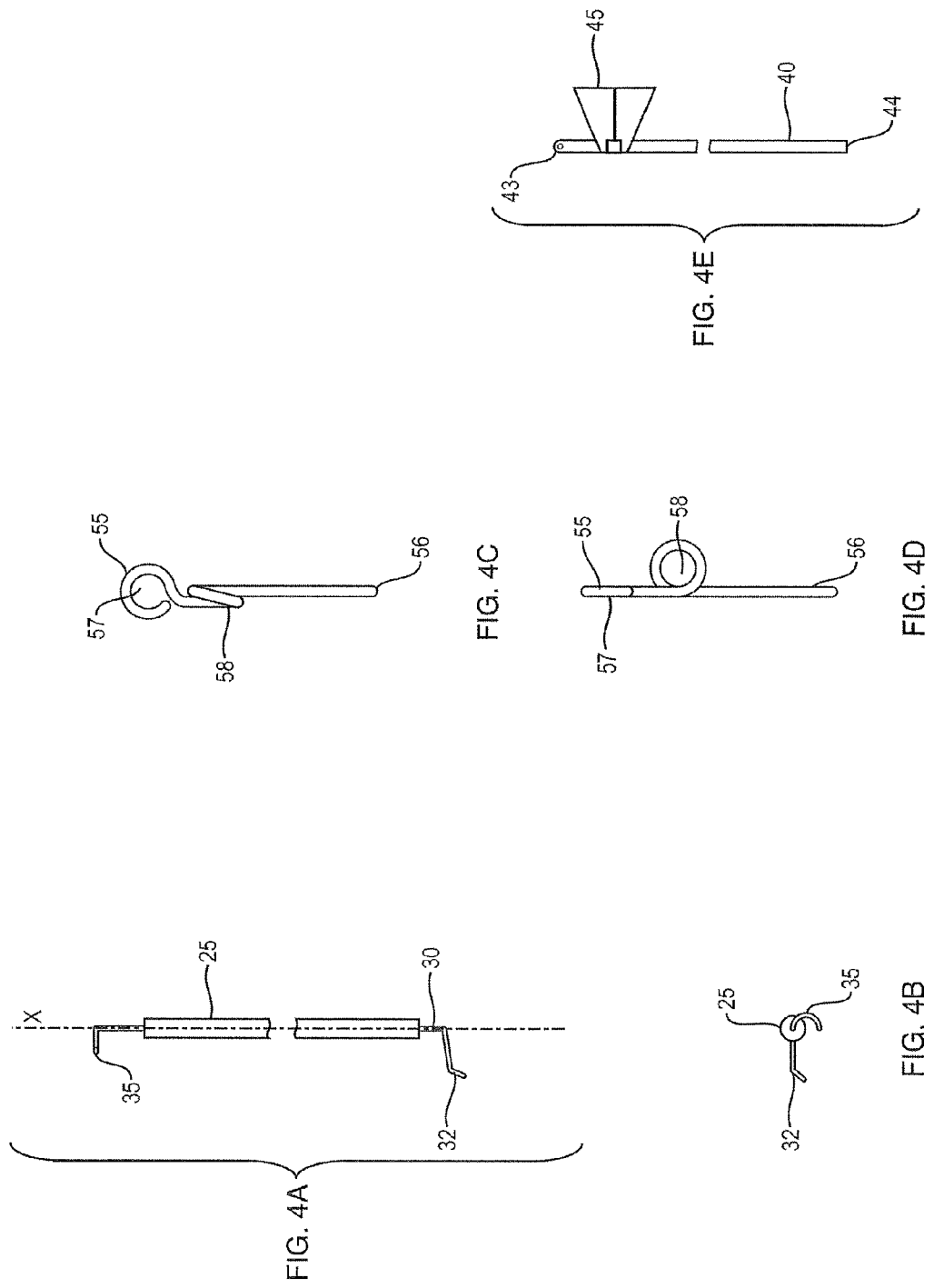

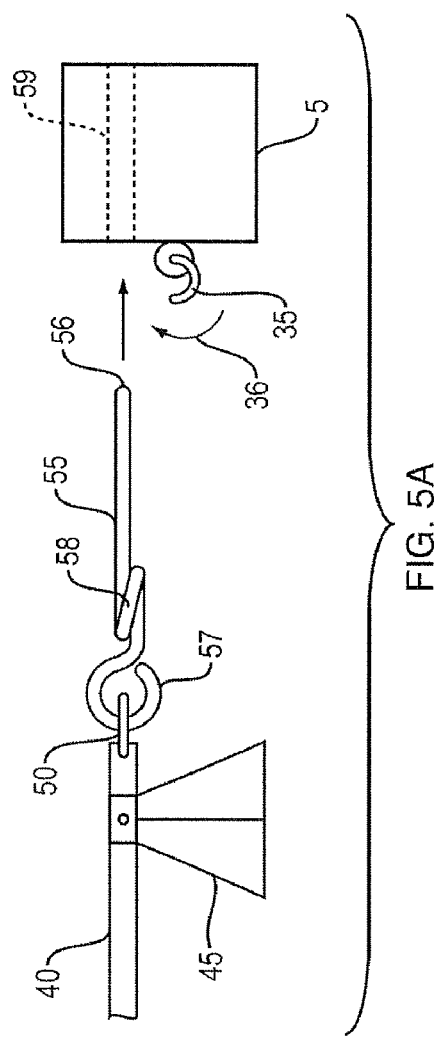
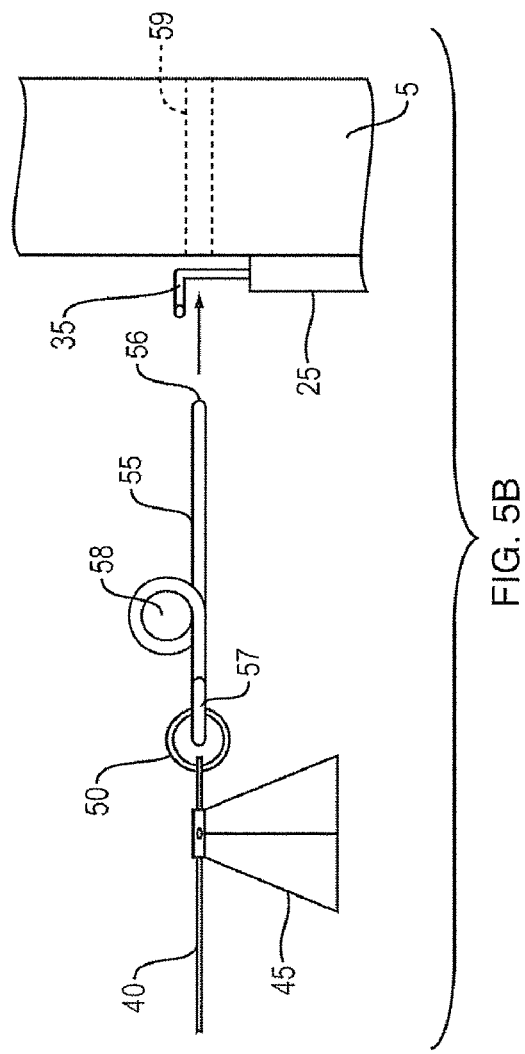

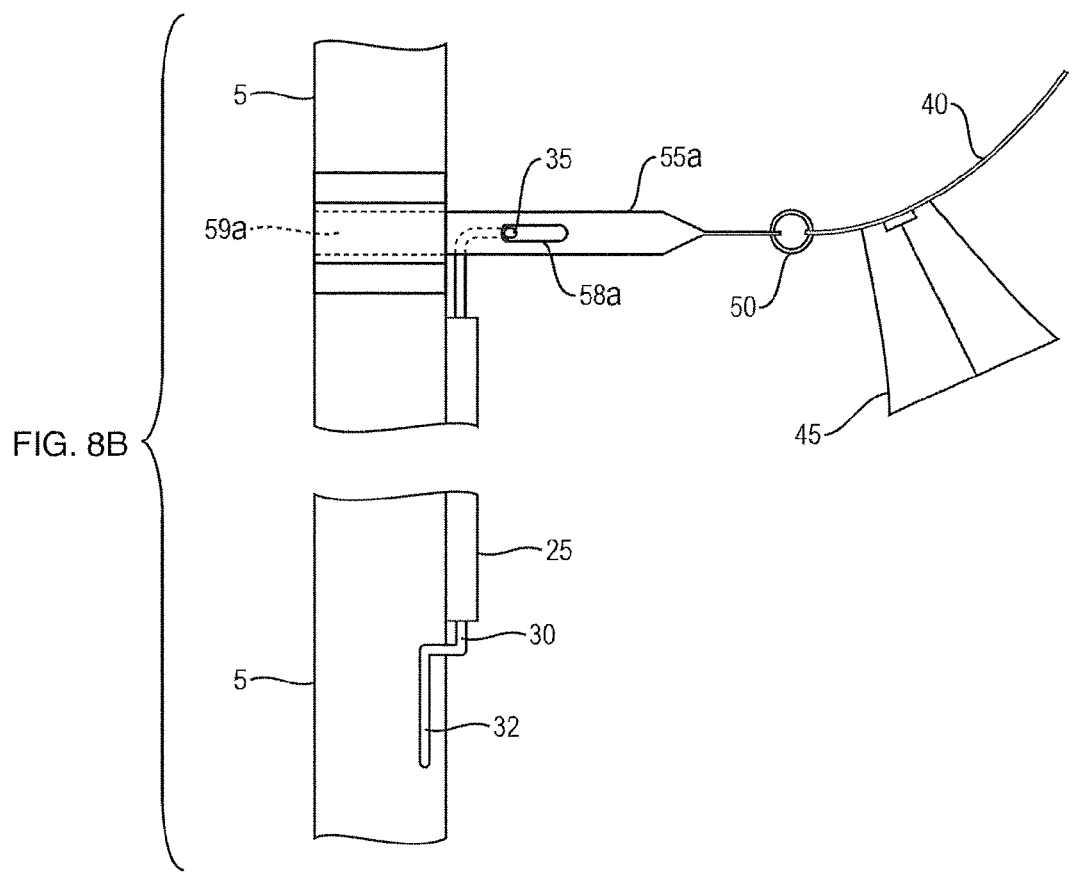

APPARATUS FOR CONTROLLING THE RELEASE OF A TIP-UP SIGNAL INDICATOR FOR A TRAP

CROSS REFERENCE TO RELATED APPLICATION

The present application is a continuation of, and claims the priority benefit of, pending U.S. application Ser. No. 11/966,987, filed Dec. 28, 2007, of the same title and by the same named inventor. The entire content of that priority parent application is incorporated herein by reference.

FIELD OF THE INVENTION

This invention relates generally to ice fishing traps, and more particularly to an ice fishing trap having an improved stability and more resistant to false indications

BACKGROUND OF THE INVENTION

Ice fishing traps, also known as fishing tip-ups are well known in the art. They are used for fishing through a hole in ice layer covering a body of water such as a river or a lake. The common trap comprises a vertical mast and at least one horizontal crossbeam. The horizontal beam is laid across the hole in the ice, and acts as a base to support the trap. The lower portion of the vertical mast is equipped with a reel having a length of fishing line terminating with a fish hook. A trigger mechanism is provided, which is commonly activated by the reel in response to a fish taking the bait on the hook, becoming hooked, and attempting to escape. The trigger is configured to release a flag, or to activate an indicator, so as to provide a visual and/or aural indication to a trap that has caught a fish.

Popular traps in use today utilize a flat steel indicator spring slidingly coupled to the back of the mast, so it can be stored parallel thereto when the trap is not in use. The indicator spring carries a flag or other visual indication, and is constructed engage a trigger hook when the trap is armed. The spring may be engaged directly such as by a hole disposed therein, or indirectly by a hook engaging ring. The trigger mechanism comprises a trigger rod rotatably coupled to the beam. The trigger rod has an elbow at its lower end disposed so as to be acted upon by a tab or protrusion on the reel. The action on the elbow causes rotation of the trigger rod about its longitudinal axis. The trigger hook is coupled to the upper end of trigger rod. In operation, the upper end of the indicator spring is either directly or indirectly engaged in the trigger hook. Several methods are known to couple the spring to the trigger hook. So that the indicator spring will be released responsive to the turning of the trigger rod, which is caused in turn by the rotation of the tab on the reel.

While common, this arrangement suffers from the disadvantage of over sensitivity, as several factors may cause a false indication. The most common of those factors is wind induced motion and/or vibration, which operates to release the spring, causing a false indication of a caught fish.

Present traps exist where a plurality of cross beams are used to stabilize the trap over the ice hole. Another arrangement is to use a relatively wide cross beam. These arrangements suffer from the disadvantages of obstructing view within the hole, and poor stability, as well as interfering with access to the ice hole, needed to break newly formed ice.

There is therefore a clear and heretofore unanswered need in the art of ice fishing, for a fish trap that will be easy to set stably over an ice hole, while causing minimum obstruction to access to the ice hole. Moreover, an even greater heretofore unanswered need exist for a fish trap that will provide reliable indication of a caught fish while avoiding false indications. The present invention aims to solve those needs.

SUMMARY OF THE INVENTION

It is therefore an object of an aspect of the present invention to provide an easy to set stably over an ice hole, To that end, this aspect of the invention provides a fish trap comprising an elongated crossbeam having two opposing ends, an elongated mast, preferably hingedly coupled to the crossbeam at hinge point, such that in operational disposition the crossbeam is supported horizontally and the mast having an upper portion extending above said crossbeam and a lower portion extending below said crossbeam. The mast has a spool rotatably mounted thereto, for receiving a length of fishing line and a hook. At least two stabilizer limbs, each coupled to the crossbeam and disposed at opposite sides of the hinge point, and at some distance thereof along the crossbeam. The limbs form horizontal angles with the crossbeam and extending towards opposite sides thereof so as to form generally a Z shape.

Optionally the stabilizer limbs are hingedly coupled to said crossbeam. Further optionally, the fish trap has at least one angle limiter coupled between said crossbeam and the stabilizer limbs, for limiting the angular extension therebetween. Preferably the angle limiter limits movement to no more than 120 degrees.

In a further optional improvement, there are provided ice picks extending downwardly from said stabilizer limbs or crossbeam. Preferably, the mast, crossbeam and limbs, are foldable relative to the respective component they are attached to, so as to allow folding of the fish trap to an elongated, narrow form for storage and transport.

It is further an object of an aspect of the invention to provide a trap providing reliable indication of trapped fish while avoiding false indications. To that end, there is provided a fish trap comprising an elongated crossbeam having two opposing ends, and an elongated mast hingedly coupled at hinge point to the crossbeam such that in operational disposition the crossbeam is supported horizontally and the mast having an upper portion extending above the crossbeam and a lower portion extending below said crossbeam. The mast having a spool rotatably coupled thereto at its lower portion, the spool having a tab extending therefrom. The spool is dimensioned to receive a length of fishing line and a hook. A trigger rod extends upwardly from the lower portion to the upper portion of the mast. The trigger rod is mounted such that it is free to rotate in an arc about its longitudinal axis. The trigger rod has an elbow at its lower end, and a trigger hook at its upper end, wherein the reel tab and the elbow are situated such that when said trigger rod is an armed state, and the reel rotates, such as for example due to a fish taking the bait and attempting to escape while hooked, the tab will engage and impart motion to the elbow. A resilient tip-up signaling indicator having a proximal and distal end, the proximal end coupled to the mast near its top when the trap is in operational disposition. A trigger bolt has a retainer coupled to the signaling indicator, a hook receiver dimensioned to receive at least a portion of said trigger hook, and a stabilizer end. The trigger bolt is used to couple the signaling indicator to the trigger hook when the trap is armed. A bolt guide dimensioned to receive the stabilizer end of the trigger bolt is further provided, to better stabilize trigger mechanism against vibration and/or motion of the signaling indicator. The trigger hook is situated to engage hook receiver in the trigger bolt and to retain the signaling indicator while the trap is in an armed state.

Preferably, this aspect of the invention further comprises a coupler, disposed between said signaling indicator and said trigger bolt.

Further preferably, the bolt guide is a hole bored in said mast, dimensioned to receive therein the stabilizing end of the trigger bolt.

The preferred embodiment further provides indicator guides mounted to the mast, wherein at least one of the indicator guides is constructed to apply variable pressure to the signaling indicator, so as to control the movement of the indicator along the mast.

While each of the above described aspects of the invention provides significant advantage to any fish trap so constructed, it is a preferred embodiment that uses a combination thereof, i.e. the fish trap having an improved trigger mechanism as described, and further comprising at least two stabilizer limbs, each hingedly coupled to the crossbeam, and disposed at opposite sides of the hinge point, and at some distance thereof along the crossbeam, where the limbs form horizontal angles to the crossbeam and extending on opposite sides thereof so as to form generally a Z shape.

Similarly, but optionally, there are provided embodiments comprising ice picks, and other advantages such as the tube trigger rod holder, and the like.

Another aspect of the invention is a trigger bolt for a trap comprising an elongated stabilizing end, at least a partial loop formed at an end opposite said stabilizing end, to act as a retainer loop, and a hook receiver loop disposed between the stabilizing end and said retainer loop. The retainer loop and said hook receiver loop or a portion thereof, each lie in a loop plane. The loop planes form an angle therebetween relative to the longitudinal axis of said stabilizing end. The trigger bolt may be made as a whole of substantially rigid wire, or only the stabilizing end may be formed in a tubular shape. Such trigger bolt may be provided as a kit for conversion of existing traps, by adding the bolt to the indicator spring and drilling a hole to act as a bolt guide.

The summary above, and the following detailed description will be better understood in view of the enclosed drawings, which depict details of preferred embodiments. It should however be noted that the invention is not limited to the precise arrangement shown in the drawings and that the drawings are provided merely as examples. It should further be noted that the drawings are not necessarily to scale.

FIGS. 4 a, 4b, 4c, 4d, and 4e, depict trigger mechanism parts.

FIGS. 5a and 5b depict the upper parts of the trigger mechanism in pre-deployed state.

Figure 6:
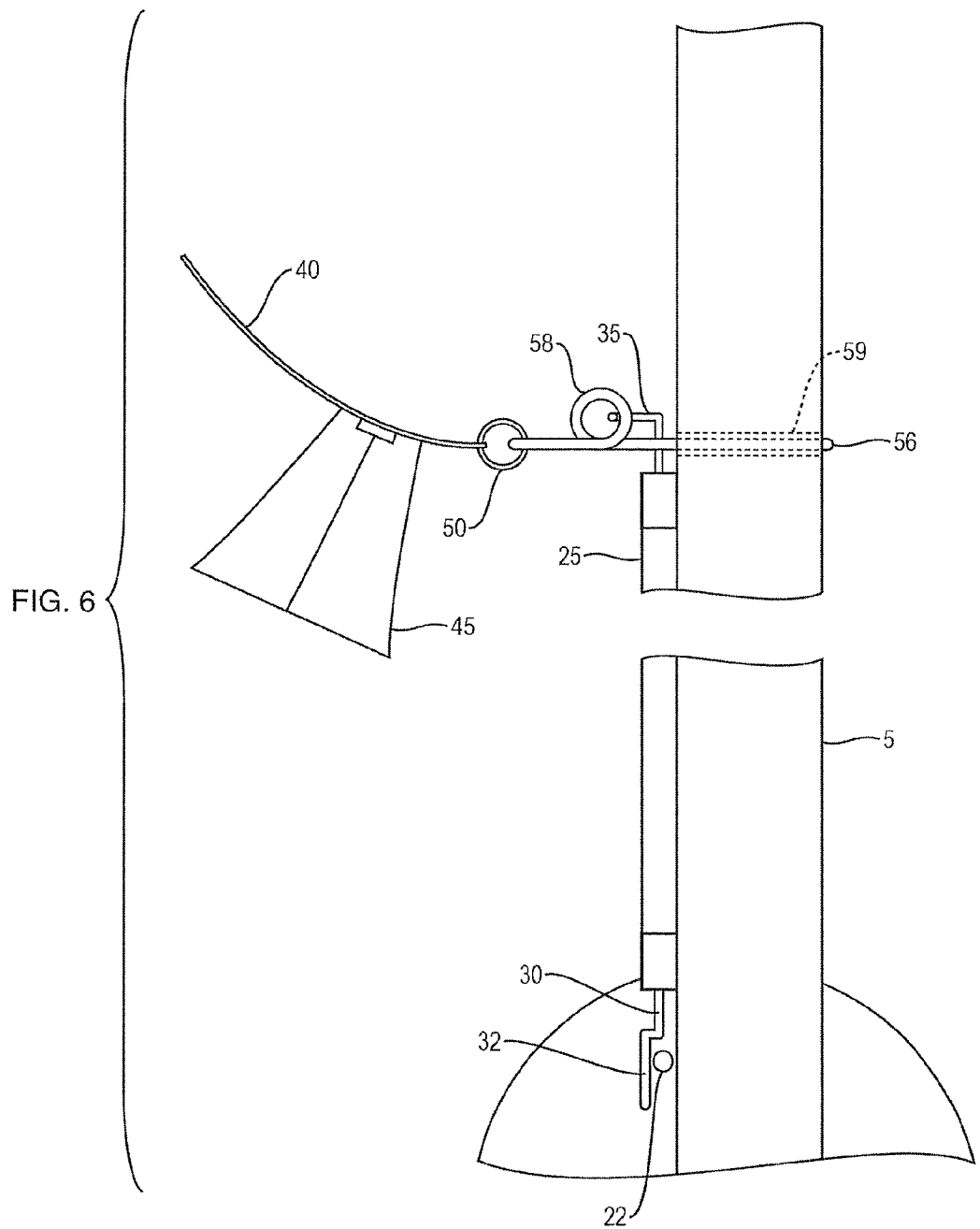

FIG. 6 depicts a side view of the trigger mechanism in a deployed (armed) state.

Figure 7:
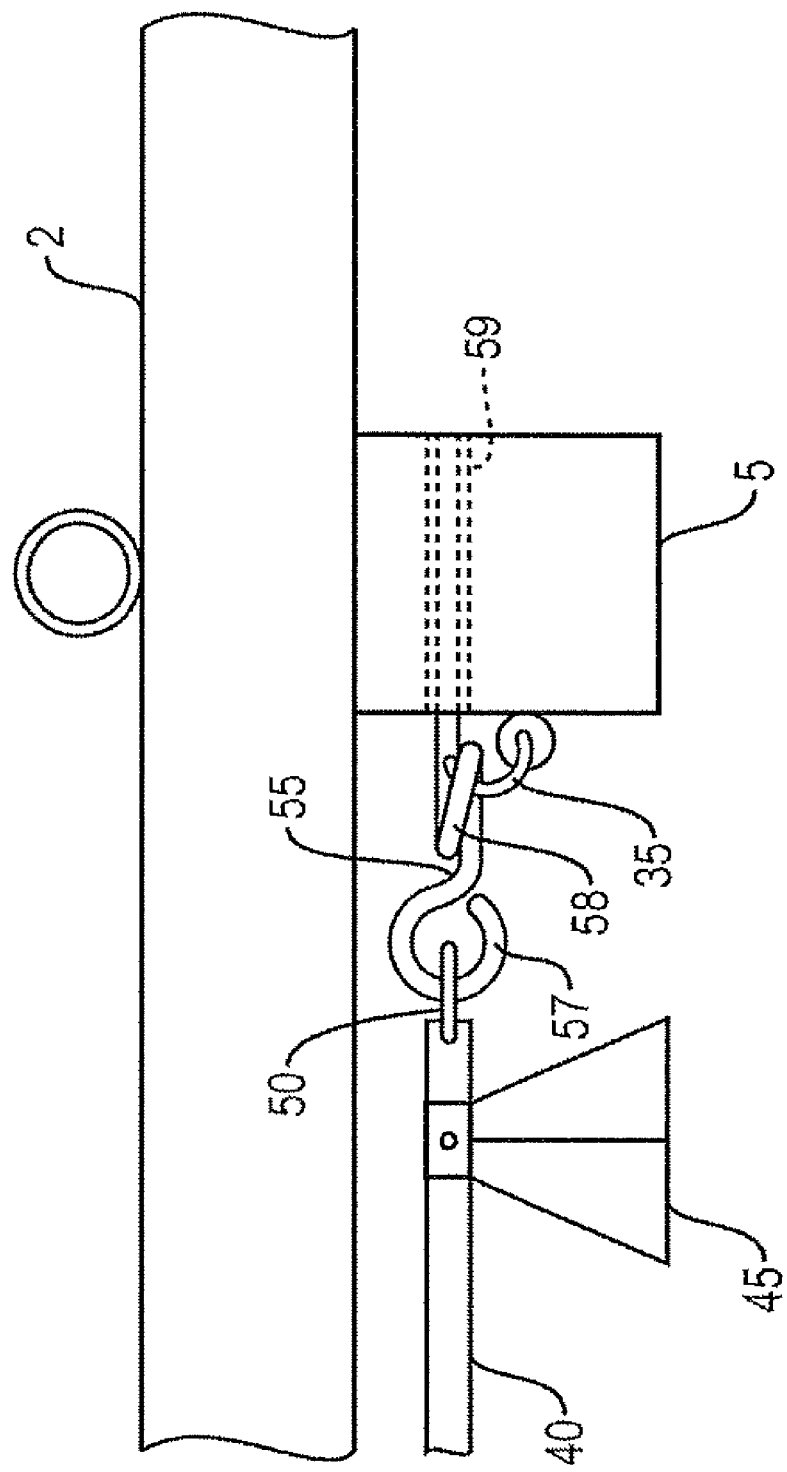

FIG. 7 depicts a top view of he trigger mechanism in a deployed state.

FIGS. 8a, 8b, and 8c-f depict yet another alternative construction to the trigger mechanism.

Figure 9:
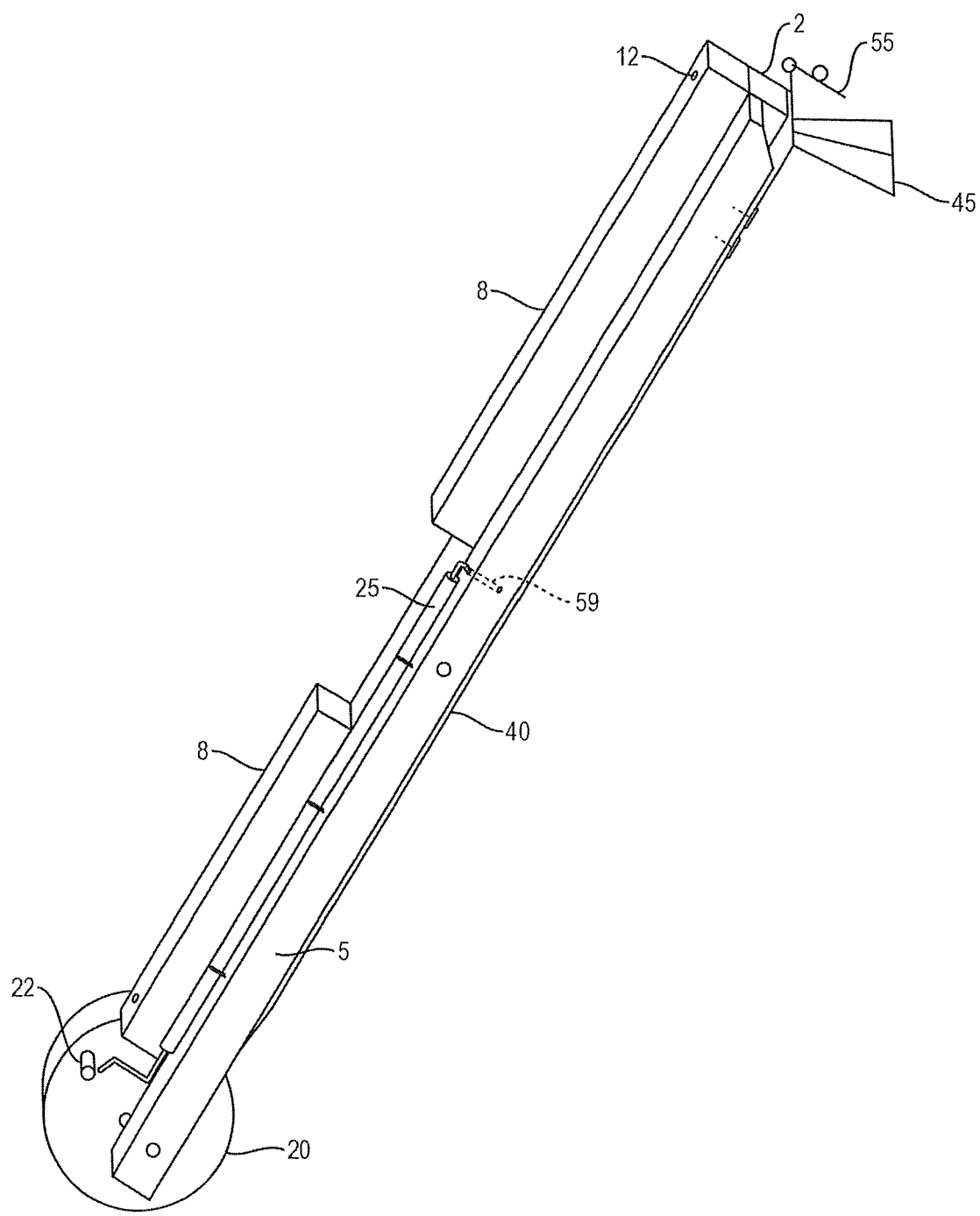

FIG. 9 depicts a trap according to the preferred embodiment of the invention, shown in a folded state.

DETAILED DESCRIPTION

The preferred embodiment of a fish trap according to the invention comprises a foldable frame, having an elongated crossbeam 2 hingedly coupled to an elongated mast 5. Preferably, the crossbeam and mast are hinged at a hinge point 4 about their mid-length. A stabilizer bar 8 is hingedly coupled at, or adjacent to, each end of the crossbeam 2. Preferably the trap may be folded to reduce its size when not deployed as shown in FIG. 9. Other portions of the trap, and the manner by which they cooperate in various embodiments, will be explained below with reference to various drawings.

Figure 1:
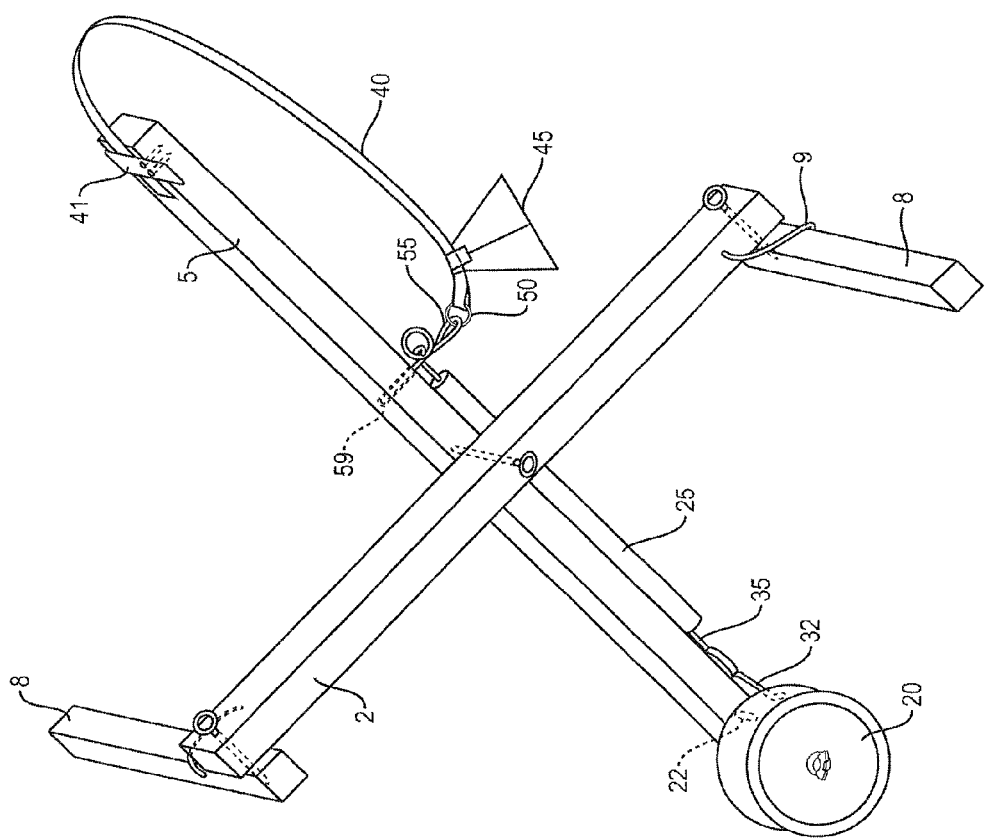
FIG. 1 depicts a perspective view of a fish trap in a deployed disposition.
Figure 2:
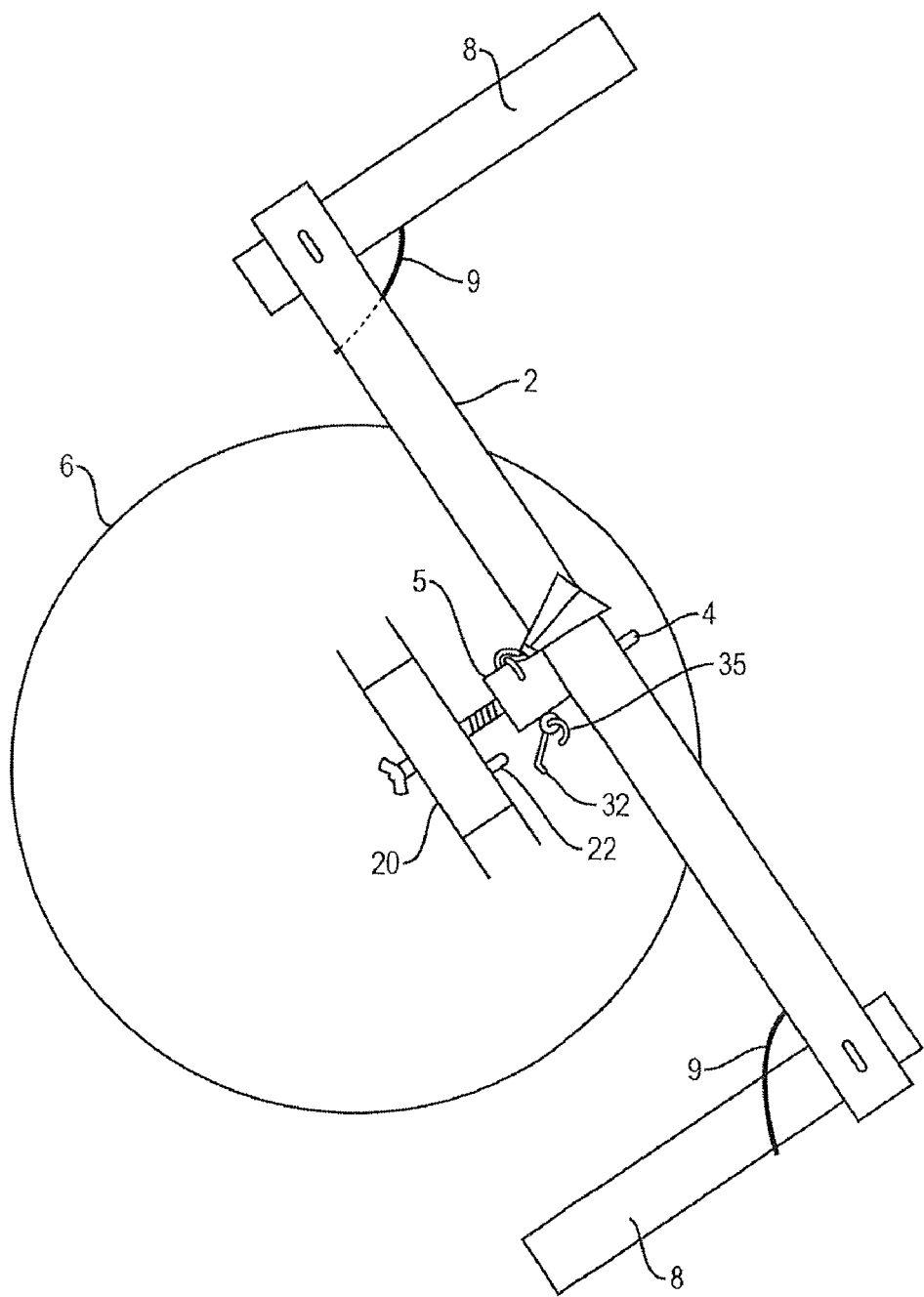
FIG. 2 depicts a top view of a fish trap in a deployed disposition.
Figure 3:
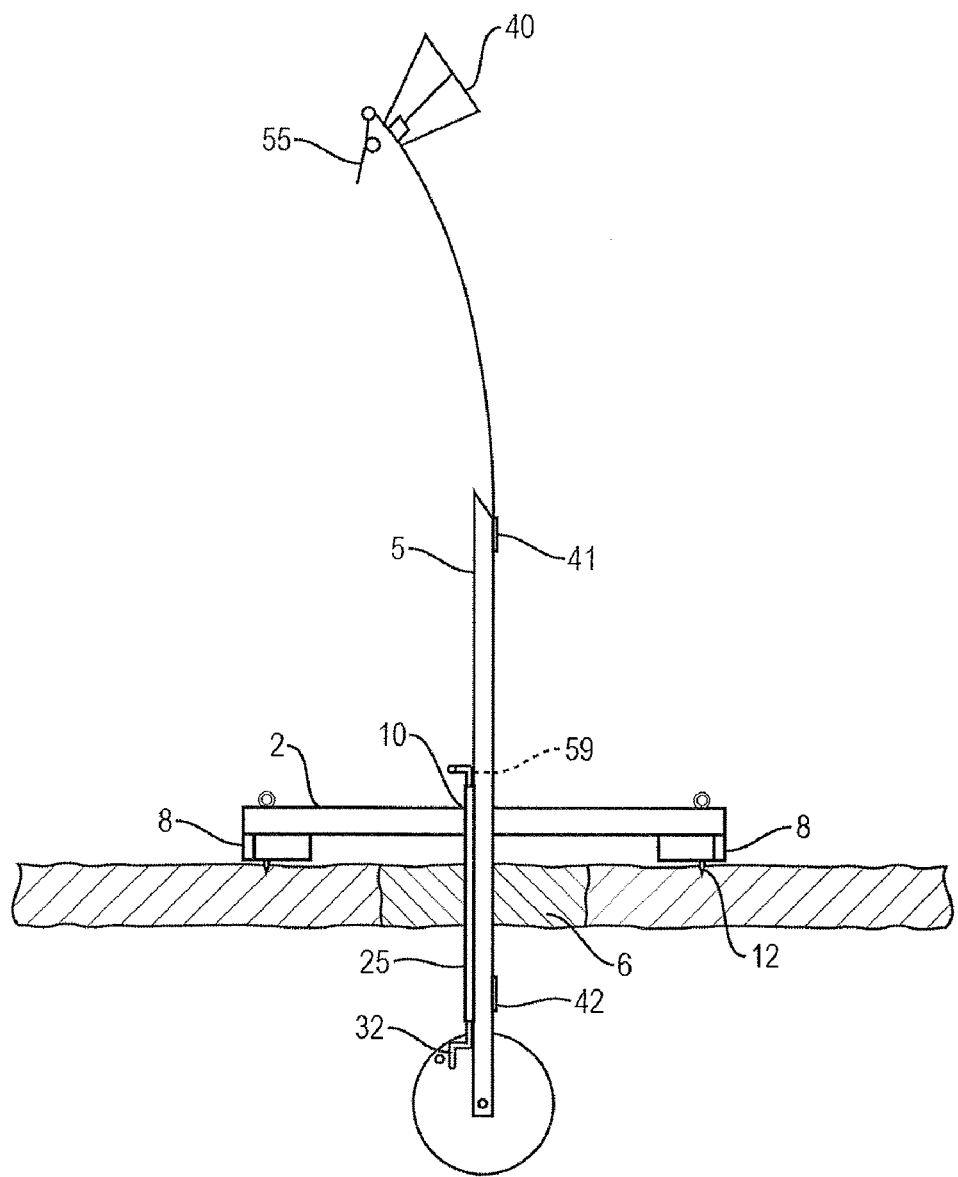
FIG. 3 is a side view of a fish trap, depicting a flag indicating that a fish is caught.

FIG. 1 depicts a schematic perspective view of the fish trap according to the preferred embodiment of the invention, FIG. 2 depicts a top view thereof, and FIG. 3 depicts a frontal elevation of the trap in operational state indicated a caught fish. In FIGS. 2 and 3 the trap is shown in a deployed disposition over an ice hole 6.

Crossbeam 2 extends horizontally over the ice hole 6, and stabilizer limbs 8, preferably bar shaped, are extended at a horizontal angle thereto. Preferably each of the stabilizer limbs extends at or about 70°-80° to the longitudinal axis of the crossbeam, and at opposite sides thereof, so as to generally approximate a Z shape as shown in FIG. 2. However varying angles are contemplated as may be required to better fit ice conditions, and the like. In order to allow folding of the trap to as small volume as possible, it is desirable that the stabilizer limbs be hingedly coupled to the crossbeam, and that an angle limiter such as a string, wire, or arc, be provided to limit the angular range of motion of the stabilizer limbs/bars 8 relative to the crossbeam. This arrangement provides high level of stability and resistance to tipping of the trap due to wind or a fish pull.

Due to the use of a simple, relatively narrow crossbeam 2, the trap causes only small obstruction of the ice hole, while the stabilizer bars 8 provide excellent stability. In certain embodiments, one or more ice pick 12 are provided, extending downwardly from the stabilizer limbs and/or from the crossbeam, to engage the ice and increase stability and resistance to pull such as when a fish is hooked.

In operational disposition, mast 5 extends substantially vertically so that a top portion thereof extends generally upwards from the point of intersection 10 with the crossbeam 2, while a bottom portion extends generally into the ice hole, from the point of intersection 10.

A reel 20 capable of holding a length of line and a hook is rotatably mounted to the bottom portion of the mast 5. The reel is equipped with a tab 22. The reel is used for receiving a length of fishing line and a hook, as known.

FIGS. 4a-4e depict a detailed view of parts of the trigger mechanism according to the described embodiment. A trigger rod holder 25, shown in FIG. 4a, is mounted to the mast, and extends along at least a portion of its length. Preferably, trigger rod holder 25 comprises a tube having narrow openings at its extremities, the openings being dimensioned to receive a trigger rod 30 and allow it to rotate freely at least along an arc centered at its longitudinal axis X-X. Preferably, the trigger rod holder contains a lubricant to reduce rotational friction of the trigger rod. More preferably, a seal is applied to the openings inside the tube to facilitate lubricant retention. However trigger rod holder may be accomplished with any convenient mounting method such as an open tube, staples, track, and the like, that will allow the trigger rod to rotate about its longitudinal axis X-X.

Trigger rod 30 is disposed in trigger rod holder 25. The trigger rod has a long straight part, which is referred herein as the longitudinal axis thereof, depicted as X-X in FIG. 4a. The preferred embodiment calls for mounting the trigger rod at a slight angle to the mast length, but this is optional. At its lower part, the trigger rod has an elbow 32 extending towards the reel, and disposed so as to be operated upon by a tab 22 which rotates with the reel. The movement imparted by the tab causes trigger rod to rotate within the trigger rod holder. At its upper part, trigger rod has a trigger hook 35, which rotates therewith. FIG. 4b depicts a top view of the trigger rod and the trigger rod holder, showing the trigger hook.

FIGS. 4c and 4d depict an example of a trigger bolt 55 according to the preferred embodiment. The trigger bolt has a stabilized end 56, a retainer 57 used to couple the trigger bolt to indicator spring 40, and a hook receiver 58. The hook receiver is dimensioned to receive therein the trigger hook.

An indicator spring 40 is mounted to the mast 5 and acts as a resilient tip-up indicator. Preferably, indicator spring is a flat steel spring, and is slidably mounted alongside the mast. Spring guides 41, 42, are provided to maintain the indicator spring in place, to allow convenient storage of the spring when the trap is not in use. When the trap is in use, the indicator spring is withdrawn from the guide. Preferably, the spring guide, or a portion thereof, applies adjustable pressure to the spring, such as by using a pressure member to urge the spring against the mast spine. The specific method of providing adjustable pressure is a matter of technical choice clear to the skilled in the art. A flag, pendant, or similar visual indicator 45 is preferably attached to the indicator spring. The indicator spring 40 has an attachment hole 43, or other attachment mechanism at its distal end as shown in FIG. 4E When operational, the indicator spring 40 is extended so as to have its proximal end 44 at or near the top of the mast 5. Indicator spring 40 is bent towards the trigger hook region, so as to exert some pull to the trigger bolt against the trigger hook, however the spring is elastically urged to obtain a vertical, or near vertical disposition when released.

FIG. 5a depicts a front view of the trigger mechanism in pre-deployed state, and FIG. 5b depicts the same parts in similar disposition s viewed from the side.

Trigger bolt 55 is preferably coupled to indicator spring 40 via a coupler 50. The coupler 50, preferably ring shaped, acts to absorb forces and vibration created by wind gusts and the like, and reduce their effect on trigger bolt 55. The coupler is attached to the distal end of the indicator spring via attachment 43, which is preferably a hole in the spring. It is noted that the coupler may be any link providing flexible coupling link between the indicator spring and the trigger bolt, such as a piece of material having one or more holes. The term ring as applied to the coupler 50 should be construed as any shape that is closed and may be extended to a polygon and the like.

In the preferred embodiment trigger bolt 55 is made of stiff wire. A loop formed at one end thereof is used as retainer 57. Retainer 57 is coupled to the indicator spring, either directly, or preferably via the coupler 50. The trigger bolt 55 further has a hook receiver 58 dimensioned to receive the trigger hook. The trigger bolt further has a stabilized end 56 which is dimensioned to be at least partially slidably received within a bolt guide 59. In FIGS. 5a and 5b the trigger bolt is seen ready to be armed. The trigger bolt 55 is seen disposed to be pushed into the bolt guide 59, so as to allow trigger hook 35 to engage the hook receiver 58.

FIG. 6 depicts the armed trigger mechanism. To arm the fish trap, the stabilized end 56 of the trigger bolt 55 is inserted in bolt guide 59, which in the preferred embodiment is a hole drilled in the mast 5. Trigger rod 30 is rotated as indicated by arrow 36 in FIG. 5a, and engages hook receiver 58. The rotation further brings elbow 32 to a position where rotation of the reel will cause tab 22 to urge the trigger rod to be rotated against the direction of arrow 36. FIG. 7 shows top view detail of the trigger hook and trigger bolt while the trap is armed.

A turn of the reel 20, such as due to a fish taking the bait and getting hooked on the hook, will cause the tab 22 to engage elbow 32 and to act thereupon to rotate trigger rod 30, which in turn causes the rotation of trigger hook 35 in the opposite direction of arrow 36. Thus, trigger hook 35 disengages from hook receiver 58, freeing the trigger bolt. A component 44 of the force exerted by indicator spring 40 urges the trigger bolt to be released from bolt guide 59, and thus the indicator spring is released and moves to the vertical position, indication a fish is hooked.

The guided stabilized end provides excellent stability and resistance against false triggering. Further protection and shock absorption is provided by the optional coupler 50, which preferably is made of resilient material to further its shock absorption capacity. Typically, the stabilized end 56 is situated away from the hook receiver towards the mast 5, and bolt guide 59 is bored in the mast 5, forward of the hook receiver. This trigger bolt arrangement provides improved stability as the forces exerted by wind and vibration are directed along the trigger bolt and the trigger hook engages the hook receiver that is stabilized against lateral and/or vertical movement.

Figure 8A:
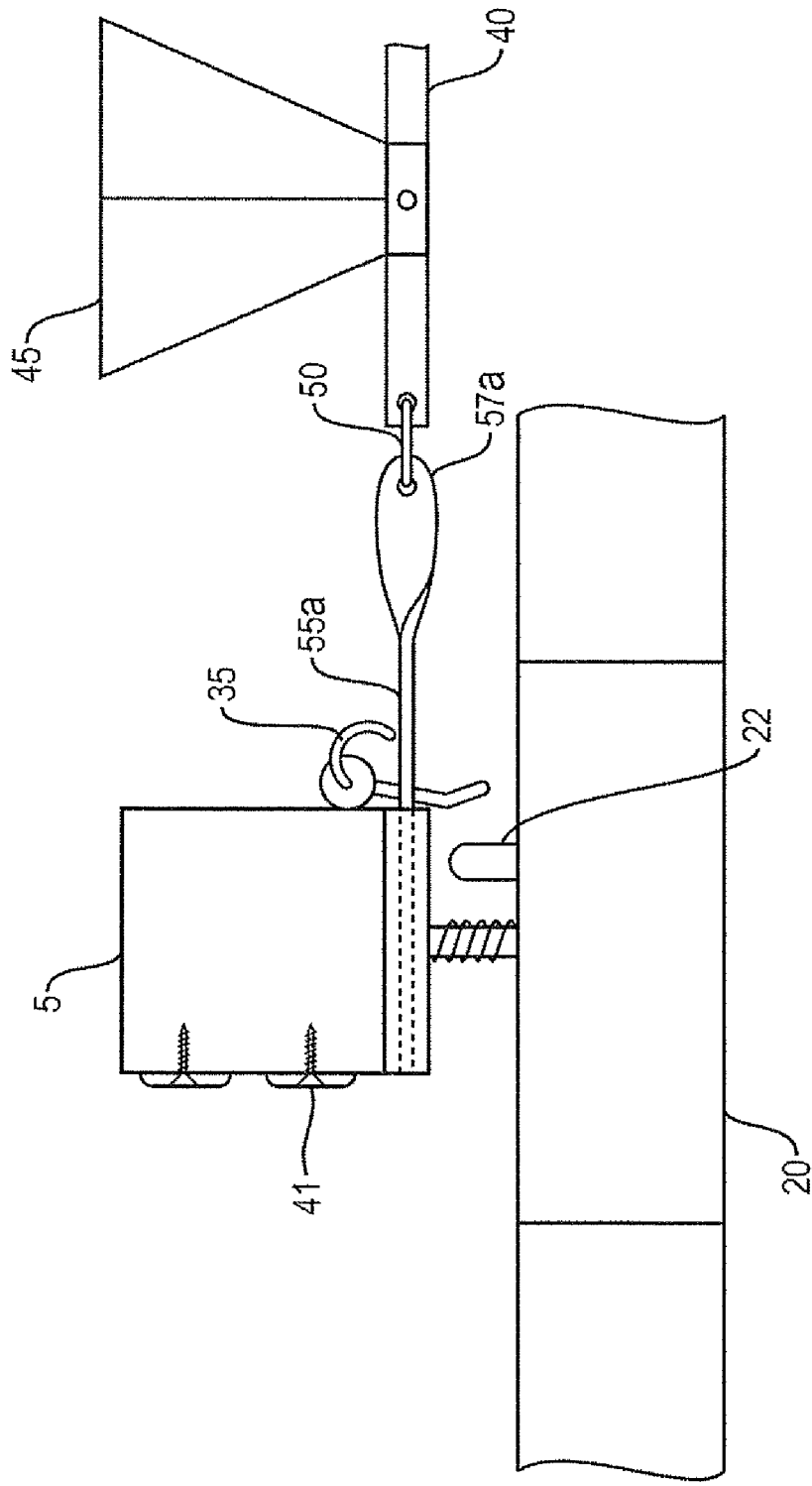
Figure 8C:
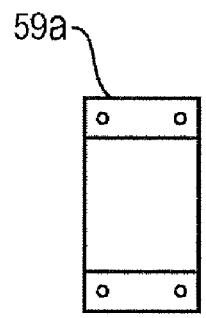
Figure 8D:
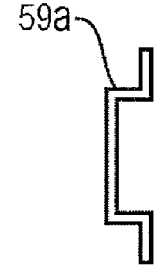
Figure 8E:
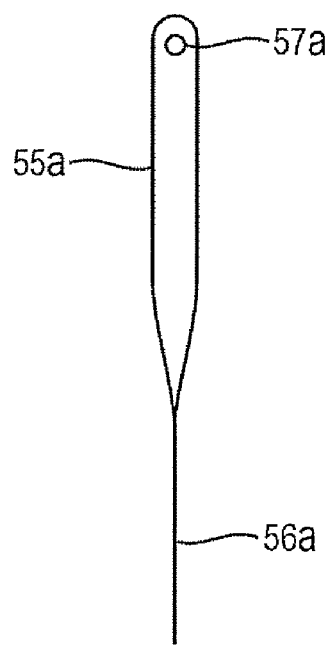
Figure 8F:
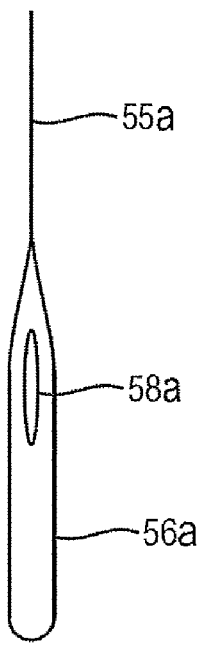

It is noted that the trigger bolt 55, and trigger bolt guide 59 may take any convenient shape as long as it provides the necessary hook receiver and stabilized end of the trigger bolt that engages the bolt guide when the trap is armed. Thus for example FIGS. 8a and 8b depict top and side views respectively, of an alternative embodiment where the trigger bolt 55a is made of a twisted sheet material. The bolt guide 59a in this embodiment is constructed to receive a stabilized end of the trigger bolt that is flat. FIGS. 8c and 8d depict a front and side view respectively of bolt guide 59a of such an embodiment. FIGS. 8e and 8f depict a front and top view of the alternative trigger bolt 55a showing the bolt that can easily be punched out of sheet material with the retainer 57a and the trigger bolt receiver 58a are pre-cut as part of the punching process. The punched bolt 55a is then given a twist that will position the retainer portion 57a at an angle to the portion containing stabilized end 56a and bolt receiver 58a. Alternatively, a twist may be entered in coupler 50 (not shown) and trigger bolt 55 may be flat from one end to the other; however, if utilizing a trigger bolt that is flat from one end to the other, it is desirable to have the stabilized end 56 of the trigger bolt 55 lie naturally at about 90 degrees with respect to the trigger bolt guide 59 in relation to their respective flat sides. The manner of building the trigger bolt and cooperating trigger bolt guide, as well as the hook receiver and cooperating trigger hook, and the large number of the variations available thereupon, are a technical matter clear to those skilled in the art in light of the teaching of these specifications.

It should be noted that the directions provided herein are approximate and relate primarily to an ideally situated trap in an operational position. Variations from this ideal position are very common and are not significant to the operation of the invention. By way of example, a crossbeam is likely not to lie exactly horizontal due to varying surface conditions, the angle between the mast and the crossbeam may vary and the mast may often stray from the precise vertical disposition. Similarly slight angular and spatial variations may exist regarding the trigger mechanism or stabilizer bars are also common. However the teaching of these specifications should be taken to encompass such common variations. The term Z shape should be construed to mean an elongated center section with two limbs extending at any angle, at opposite sides of the center section, each of the limbs being at a different side of the midsection point of the center section.

Yet another aspect of the invention is the trigger bolt 55 as shown in FIGS. 4c and 4d. The trigger bolt is preferably made of substantially rigid tube, such as a stiff wire, and having a retainer loop formed at one end thereof, a hook receiver loop formed in the wire, and dimensioned to receive the trigger hook, and a stabilized end. The retainer loop and the hook receiver loop each form a loop plane in which the loop substantially lies. The retainer and hook receiver loops are formed at some angle relative to the longitudinal axis of the stabilizing end 56. Preferably this angle is a right angle, but other angles are also considered. The trigger bolt may then be provided as a conversion kit, and be used for converting existing traps to traps having the improved trigger mechanism described herein, by drilling a hole in mast 5 which acts as bolt guide 59, and attaching the trigger bolt to the indicator spring.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention, for which letters patent is applied.

What is claimed is:

1. An apparatus for controlling the release of a tip-up signal indicator for a trap, wherein the tip-up signal indicator includes a spring and a visual indicator, and the trap includes a mast having a first end and a second end, wherein the spring of the signal indicator is mounted to the mast and a movable reel is mounted to the second end of the mast, the apparatus comprising:
   a. a trigger bolt including a stabilizing end, a signal indicator retainer and a receiver disposed between the stabilizing end and the signal indicator retainer, wherein the stabilizing end is configured to stabilize a position of the trigger bolt to the first end of the mast when the movable reel is not moving, and the signal retainer is configured to retain the trigger bolt to the signal indicator; and
   b. a trigger rod movably connected to the mast, wherein the trigger rod includes a first end and a second end arranged such that the first end of the trigger rod is adjacent to the first end of the mast and the second end of the trigger rod is adjacent to the movable reel, wherein the first end of the trigger rod is configured for releasable engagement with the receiver of the trigger bolt and to releasably retain the trigger bolt to the first end of the mast, wherein the second end of the trigger rod is configured to engage the movable reel such that, when the first end of the trigger rod is engaged with the receiver of the trigger bolt, movement of the reel displaces the second end of the trigger rod, which causes the first end of the trigger rod to disengage the trigger rod from the trigger bolt and thereby causes the trigger bolt to release from the mast.

2. The apparatus of claim 1, wherein the trigger rod rotates to release the trigger bolt.

3. The apparatus of claim 1, wherein the first end of the mast includes a bolt guide and the stabilizing end of the trigger bolt is configured to releasably fit into the bolt guide of the first end of the mast.

4. The apparatus of claim 1, wherein the trigger bolt receiver is a ring and the first end of the trigger rod is a hook.

5. The apparatus of claim 1, wherein the second end of the trigger rod is an elbow shape.

6. The apparatus of claim 1, wherein the signal retainer of the trigger bolt is connectable to the visual indicator of the signal indicator.

7. The apparatus of claim 6, wherein the signal indicator includes a coupler joined to the visual indicator, and wherein the signal retainer of the trigger bolt is connectable to the coupler.

8. The apparatus of claim 1, wherein the trigger rod is movably retained within a trigger rod holder.

9. The apparatus of claim 1, wherein the trigger bolt and the trigger rod are made of metal.

* * * * *